United States Patent
Pothier et al.

(10) Patent No.: US 10,075,702 B2
(45) Date of Patent: Sep. 11, 2018

(54) ELECTRONIC DEVICE WITH AN UPSCALING PROCESSOR AND ASSOCIATED METHODS

(71) Applicant: STMICROELECTRONICS SA, Montrouge (FR)

(72) Inventors: Olivier Pothier, Sceaux (FR); Arnaud Bourge, Paris (FR)

(73) Assignee: STMICROELECTRONICS SA, Montrouge (FR)

( * ) Notice: Subject to any disclaimer, the term of this patent is extended or adjusted under 35 U.S.C. 154(b) by 141 days.

(21) Appl. No.: 15/204,185

(22) Filed: Jul. 7, 2016

(65) Prior Publication Data

US 2018/0014006 A1    Jan. 11, 2018

(51) Int. Cl.
G06T 3/40 (2006.01)
H04N 13/271 (2018.01)
H04N 13/02 (2006.01)

(52) U.S. Cl.
CPC ........... H04N 13/271 (2018.05); G06T 3/40 (2013.01); H04N 13/0271 (2013.01)

(58) Field of Classification Search
CPC ........ G06T 3/40; H04N 13/0271; H04N 5/33; H04N 5/374; H04N 5/378
USPC .............................................. 348/46, 47, 45
See application file for complete search history.

(56) References Cited

U.S. PATENT DOCUMENTS

| | | | |
|---|---|---|---|
| 7,262,402 B2 | 8/2007 | Niclass et al. | |
| 7,889,949 B2 | 2/2011 | Cohen et al. | |
| 8,964,067 B2 * | 2/2015 | Conley | H04N 5/262 348/159 |
| 2012/0195492 A1 * | 8/2012 | Ali | G06T 3/4007 382/154 |
| 2014/0328546 A1 * | 11/2014 | Kourousias | G06T 3/40 382/239 |
| 2015/0036014 A1 * | 2/2015 | Lelescu | H04N 13/0029 348/218.1 |
| 2016/0047904 A1 | 2/2016 | Mellot | |
| 2016/0119983 A1 | 4/2016 | Moore | |

(Continued)

OTHER PUBLICATIONS

Niclass et al, A 128×128 single-photon image sensor with column-level 10 bit time to digital converter array (Year: 2008).*

(Continued)

*Primary Examiner* — Shan E Elahi
(74) *Attorney, Agent, or Firm* — Slater Matsil, LLP

(57) ABSTRACT

An electronic device includes a single-photon avalanche diode (SPAD) array and readout circuitry coupled thereto. The readout circuitry generates a depth map having a first resolution, and a signal count map having a second resolution greater than the first resolution. The depth map corresponds to distance observations to an object. The signal count map corresponds to intensity observation sets of the object, with each intensity observation set including intensity observations corresponding to a respective distance observation in the depth map. An upscaling processor is coupled to the readout circuitry to calculate upscaling factors for each intensity observation set so that each distance observation has respective upscaling factors associated therewith. The depth map is then upscaled from the first resolution to the second resolution based on the respective upscaling factors.

16 Claims, 5 Drawing Sheets

(56) References Cited

U.S. PATENT DOCUMENTS

| | | | | |
|---|---|---|---|---|
| 2017/0052065 A1* | 2/2017 | Sharma | ............... | G01S 7/4863 |
| 2017/0131089 A1* | 5/2017 | Bronstein | .......... | H04N 13/0246 |
| 2017/0176579 A1* | 6/2017 | Niclass | ............... | G01S 7/4863 |
| 2017/0179173 A1* | 6/2017 | Mandai | ............ | H01L 27/14609 |
| 2017/0184704 A1* | 6/2017 | Yang | .................... | G01S 7/4816 |

OTHER PUBLICATIONS

Pancheri et al, First demonstration of a two-tier pixelated avalanche sensor for charged particle detection (Year: 2017).*

Sun et al, Single-pixel 3D imaging with time-based depth resolution (Year: 2016).* https://en.wikipedia.org/wild/Upsampling; Retrieved from internet Jul. 5, 2016: pp. 4.

Farisiu et al. "Fast and Robust MultifremeSuper Resolution", IEEE Transactions on Image Processing, 13(10), Oct. 2004: pp. 1327-1344.

Kopf et al. "Joint Bilateral Upsampling", ACM Transactions on Graphics (TOG), 26(3), 2007: pp. 5.

He et al. "Guided Image Filtering", IEEE Transactions on Attern Analysis and Machine Intelligence. vol. 34; 2013: pp. 13.

Chan et al. "A Noise-Aware Filter for Real-Time Depth Upsampling" M2SFA2 2008 Workshop on Multi-camera and Multi-modal Sensor Fusion: 2008: pp. 12.

Tomasi et al. "Bilateral filtering for gray and color images" ICCV'1998, Proceedings of the 1998 IEEE International Conference on Computer Vision, Bombay, India: 1998; pp. 839-846.

Tetrault et al. Real-time discrete SPAD array readout architecture for time of flight PET. (Submitted on Jun. 15, 2014) http://arxiv.org/abs/1406.3858: pp. 6.

* cited by examiner

ELECTRONIC DEVICE WITH AN UPSCALING PROCESSOR AND ASSOCIATED METHODS

FIELD OF THE INVENTION

The present invention relates to the field of electronic devices, and more particularly, to an electronic device with an upscaling processor for upscaling a depth map and related methods.

BACKGROUND

A number of applications require fast and precise depth map evaluations. These applications include, for example, gesture recognition systems, face recognition systems, virtual keyboards, object and person monitoring, and virtual reality games.

Time-of-flight (ToF) depth sensors have become more widespread over the past years. At the high end side, some devices like the Kinect2 device from Microsoft provide a high definition depth map up to 1080p (HD). At the low end side, other ToF devices provide a low resolution depth map with just one or a few ranging points. In some cases, information related to the reflected intensity, referred to as "signal count," is also output at a higher resolution.

Even though high resolution depth devices are available, a disadvantage is cost. In sharp contrast, the low resolution devices are typically one or several order of magnitude less expensive. However, a low resolution depth map needs to be increased, such as through upsampling.

One approach to increase the number of simultaneous ranging points of a low resolution depth map is to use spatial upsampling. These methods include bilinear, weighted average, median and bicubic, for example. However, theses methods have several shortcomings.

One shortcoming is that the upsampling does not add real information. Straightforward algorithms typically result in blurry images or edge artifacts. More complex algorithms require not only more operations but also larger kernels, which may not be suited to a very low resolution depth map. More generally, border pixels are problematic or neglected in these image processing methods while their proportion may be large with a very low input resolution.

Another approach to increase the number of simultaneous ranging points of a low resolution depth map is to use super resolution from multiple acquisitions. Super resolution sums up the different information acquired at different instants. Similarly, simultaneous acquisitions from different viewpoints can be used as inputs. However, super resolution is not generic since it relies on motion between acquisitions and needs aliased inputs, or relies on the availability of several synchronized devices in the case of simultaneous acquisitions, which is then more costly. An IEEE Transactions on Image Processing article titled "Fast and Robust Multiframe Super Resolution" is computationally heavy and iterative. Even more difficult is the case for a 3×3 depth map due to the very limited input resolution, where a global motion vector would need to be estimated from two successive 3×3 inputs.

Yet another approach to increase the number of simultaneous ranging points of a low resolution depth map is to use joint bilateral upsampling. Joint bilateral upsampling makes use of two different signals available at two different resolutions. In the case of a ToF device, these would be the signal count map in parallel with the depth map, with the signal count map having a higher resolution than the depth map. Joint bilateral upsampling works better than traditional spatial upsampling by following edges from the signal count map, and is more generic and less complex than super resolution. However, joint bilateral upsampling is blind on the nature of its input data and thus does not take advantage of known properties from the device, and is a heuristic approach that needs tuning. In addition, joint bilateral upsampling remains sensitive to the fact that most input values for a 3×3 depth map are border pixels.

Even in view of the above described approaches, there is still a need to improve upsampling of a low resolution depth map.

SUMMARY

One aspect is directed to an electronic device comprising a single-photon avalanche diode (SPAD) array and readout circuitry coupled. The readout circuitry may be configured to generate a depth map having a first resolution, and a signal count map having a second resolution greater than the first resolution. The depth map may correspond to a plurality of distance observations to an object. The signal count map may correspond to a plurality of intensity observation sets of the object, with each intensity observation set comprising a plurality of intensity observations corresponding to a respective distance observation in the depth map.

The electronic device may further include an upscaling processor coupled to the readout circuitry. The upscaling processor may be configured to calculate a plurality of upscaling factors for each intensity observation set so that each distance observation has a respective plurality of upscaling factors associated therewith. The depth map may then be upscaled from the first resolution to the second resolution based on the respective plurality of upscaling factors.

The upscaling factor may be a shaping function that is advantageously based on physical properties between the intensity observations in the signal count map and the distance observations in the depth map. Each intensity observation may be proportional to an inverse of a corresponding distance observation squared. The plurality of upscaling factors advantageously upscale a single distance observation in the depth map to a plurality of distance observations.

The SPAD array and readout circuitry may simultaneously generate the depth map and the signal count map. The upscaling may be performed in real-time and on-the-fly without requiring calibration.

The electronic device may further comprise an infrared light source for illuminating the object.

The upscaling processor may be configured to calculate the plurality of upscaling factors for each intensity observation set based on an average intensity observation value of the intensity observation set and on individual intensity observation values within the intensity observation set. More particularly, the plurality of upscaling factors may be based on the following equation:

$$f(\overline{SigCnt_i}, SigCnt_{i,j}) = \sqrt{\frac{\overline{SigCnt_i}}{SigCnt_{i,j}}}$$

where $\overline{SigCnt}$ is an average intensity observation value derived from the respective intensity observation set;

where $\text{SigCnt}_{i,j}$ is the individual intensity observation values within the respective intensity observation set;

where i varies from 1 to M and corresponds to the number of distance observations to the object; and where j varies from 1 to N and corresponds to the number of individual intensity observation values within the intensity observation set encompassing the observed distance i.

Another aspect is directed to a method for operating the electronic device as described above. The method may comprise operating the SPAD array and readout circuitry to generate the depth map having a first resolution, and a signal count map having a second resolution greater than the first resolution. The depth map may correspond to a plurality of distance observations to an object. The signal count map may correspond to a plurality of intensity observation sets of the object, with each intensity observation set comprising a plurality of intensity observations corresponding to a respective distance observation in the depth map. The method may further comprise operating an upscaling processor to calculate a plurality of upscaling factors for each intensity observation set so that each distance observation has a respective plurality of upscaling factors associated therewith. The depth map may then be upscaled from the first resolution to the second resolution based on the respective plurality of upscaling factors.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
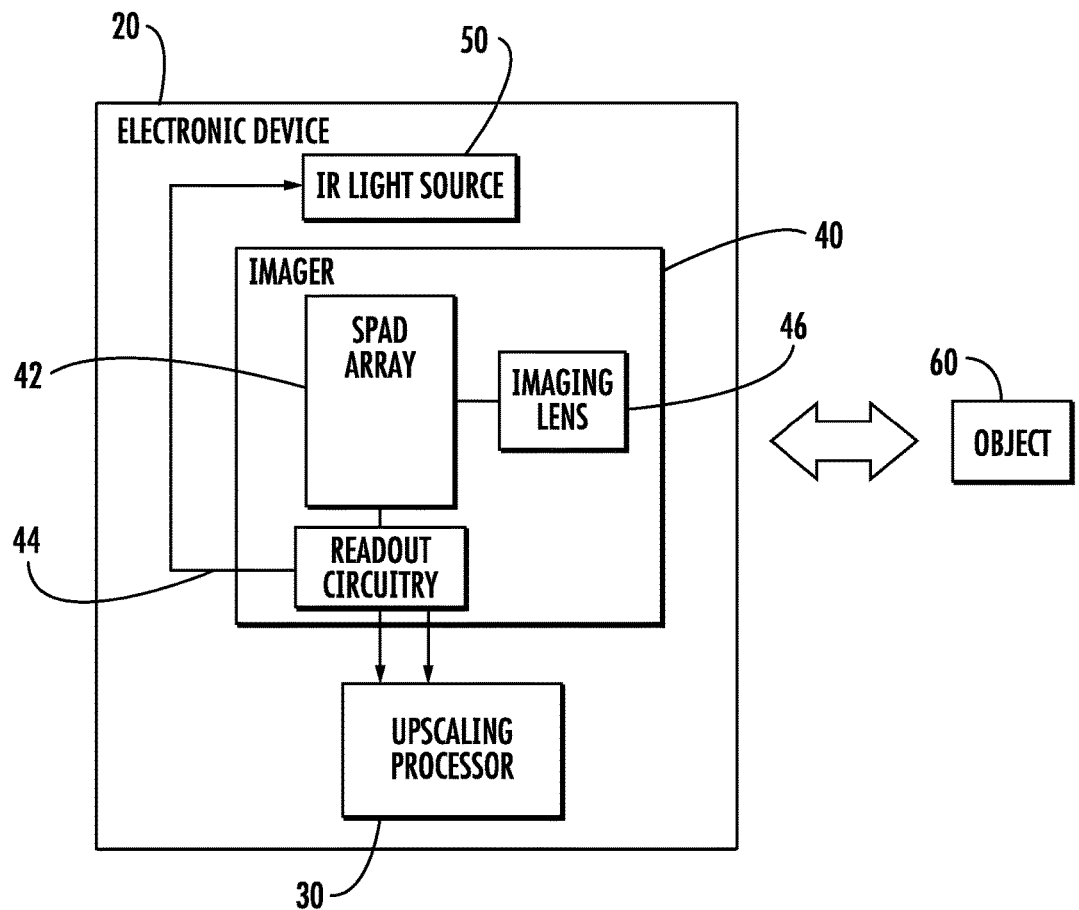
FIG. 1 is a block diagram of an electronic device with an upscaling processor for upscaling a depth map in accordance with the present invention.

An electronic device 20 with an upscaling processor 30 will be discussed in reference to FIG. 1. The upscaling processor 30 advantageously upscales a low resolution depth map of an object 60 to a higher resolution based on physical properties between intensity values in a signal count map of the object and distance observations in the depth map.

The electronic device 20 includes a SPAD array 42 and readout circuitry 44 coupled thereto. The readout circuitry 44 is configured to generate the depth map and the signal count map. The depth map has a first resolution, and corresponds to a plurality of distance observations to the object 60. The signal count map has a second resolution greater than the first resolution, and corresponds to a plurality of intensity observation sets of the object 60. Each intensity observation set comprises a plurality of intensity observations corresponding to a respective distance observation in the depth map.

The upscaling processor 30 is coupled to the readout circuitry 44 and is configured to calculate a plurality of upscaling factors for each intensity observation set so that each distance observation has a respective plurality of respective upscaling factors associated therewith. The depth map is then upscaled from the first resolution to the second resolution based on the respective plurality of upscaling factors.

The electronic device 20 further includes an imaging lens 46 coupled to the SPAD array 40, and an infrared light source 50 is used to illuminate the object 60 with optical pulses. The object 60 is hit by uncollimated light that is pulsed at a given repetition rate, as readily appreciated by those skilled in the art. The SPAD array 42, the readout circuitry 44 and the imaging lens 46 form an imager 40.

The electronic device 20 may also be referred to as a photonics device, and may be used for a number of applications that require fast and precise depth map evaluations. These applications include, for example, gesture recognition systems, face recognition systems, virtual keyboards, object and person monitoring, and virtual reality games.

Figure 2:
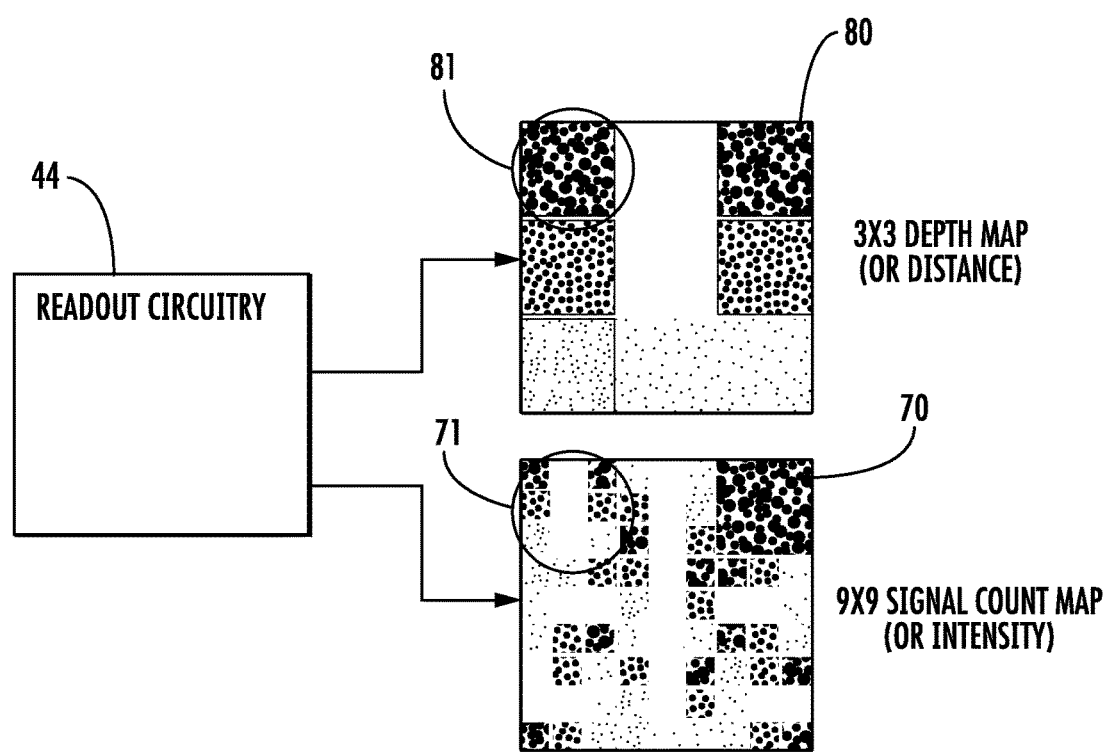
FIG. 2 is a block diagram of the readout circuitry illustrated in FIG. 1 outputting the depth map and the signal count map.

Referring now to FIG. 2, the readout circuitry 44 outputs the signal count map 70, and outputs the depth map 80. The depth map 80 and the signal count map 70 are available simultaneously, and are co-located. As will now be discussed in greater detail, the respective plurality of upscaling factors as calculated by the upscaling processor 30 is a shaping function that is advantageously based on physical properties between the intensity observations in the signal count map 70 and the distance observations in the depth map 80.

The readout circuitry 47 may include asynchronous digital counters, for example, for counting the number of pulses produced by the associated SPAD zones within the SPAD array 42 during a predetermined period of time after emission of optical pulses by the infrared light source 50. The output of the counters corresponds to the number of photons reflected by the corresponding portions of the object, and thus indicates a brightness of the object 60.

The readout circuitry 49 may also includes time-to-digital converters, for example, to determine distances to the object 60 by determining the elapsed times between the emissions of each pulse and reception of the corresponding reflected photons. The digital values determined by each time-to-digital converter indicates the time of flight of the photons, and are used for determining the distances between the associated SPAD zones within the SPAD array 42 and the corresponding portions of the object 60.

For illustration purposes, the resolution of the depth map 80 is 3×3, and the resolution of the signal count map 70 is 9×9. Depending on the intended applications, the signal count and depth maps 70, 80 may be other resolutions, as readily appreciated by those skilled in the art. Application of the respective plurality of upscaling factors as calculated by the upscaling processor 30 is not limited to any particular resolution.

For a depth map 80 with a 3×3 resolution, there are 9 distance or ranging points, i.e., observations, to the object 60. The single or individual distance observations are represented by d(i), with i varying from 1 to 9.

For a signal count map 70 with a 9×9 resolution, there are 81 intensity observations of the object 60. Based on the correlation between the two maps, there are 9 intensity observations for each distance observation. The 9 intensity observations for each distance observation form a respective intensity observation set. For example, the nine 9 intensity observations marked by circle 71 in the signal count map 70 correspond or correlate with the distance observation marked by circle 81 in the depth map 80. This grouping pattern is repeated for the remaining intensity observations and distance observations.

The intensity observation sets are represented by SigCnt (i,j), where i varies from 1 to 9 and j also varies from 1 to 9. As noted above, i represents a particular distance observation in the depth map 80. For each particular distance observation i in the depth map 80, j represents the individual intensity observations within the signal count map 70 that correlate or correspond to that particular distance observation i. In the illustrated example, each intensity observation set has 9 intensity observations.

Figure 3:
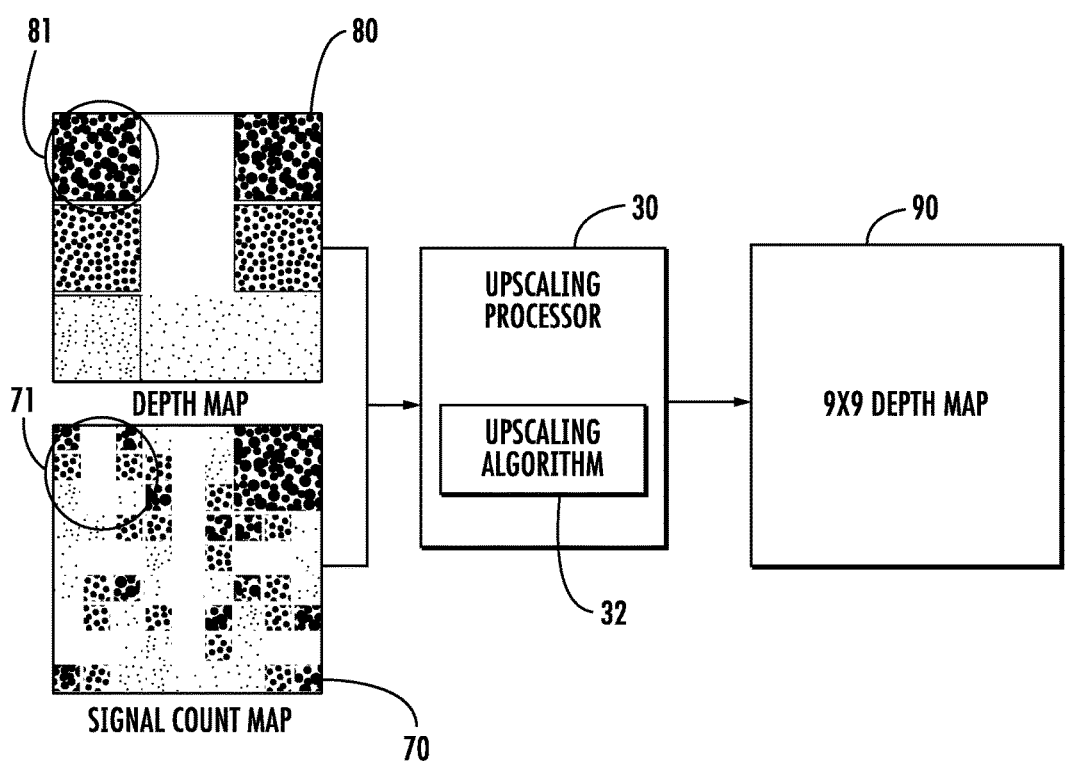
FIG. 3 is a block diagram of the upscaling processor illustrated in FIG. 1 executing an upscaling algorithm to provide the upscaled depth map.

Each upscaling factor is based on the physical link between the depth map 80 and the signal count map 70. The upscaling processor 30 executes an upscaling algorithm 32 to upscale the depth map 80 with the first resolution to a depth map 90 with the second resolution, as illustrated in FIG. 3. In the illustrated example, the 3×3 depth map 80 is upscaled to a 9×9 depth map 90. The upscaling algorithm 32 is of the following form:

$\forall SigCnt_{i,j} \in$ SPAD Array i, $\widehat{d_{i,j}} = d_i \times f(\overline{SigCnt_i}, SigCnt_{i,j})$ The $\overline{SigCnt_i}$ represents averaged signal count intensity observations for each SPAD zone within the SPAD Array 42. The averaged signal count intensity observations for each SPAD zone may be calculated based on the following:

$$\sqrt{\overline{SigCnt_i}} = \frac{N}{\sum_{j=1...N} \frac{1}{\sqrt{SigCnt_{i,j}}}}$$

As illustrated above, determination of $\overline{SigCnt_i}$ is based on the use of inverse and square root functions. Alternatively, other formulas may be used to provide a "global" signal count intensity observation per zone as readily appreciated by those skilled in the art.

Unlike for a classical n-tap filter, only 1 input distance measure is used to generate N output distances. In the illustrated example, 1 distance measure is used to generate 9 output distances. The $f(\overline{SigCnt_i}, SigCnt_{i,j})$ is a local shaping function based on physical properties between local intensities and depth.

Figure 4:
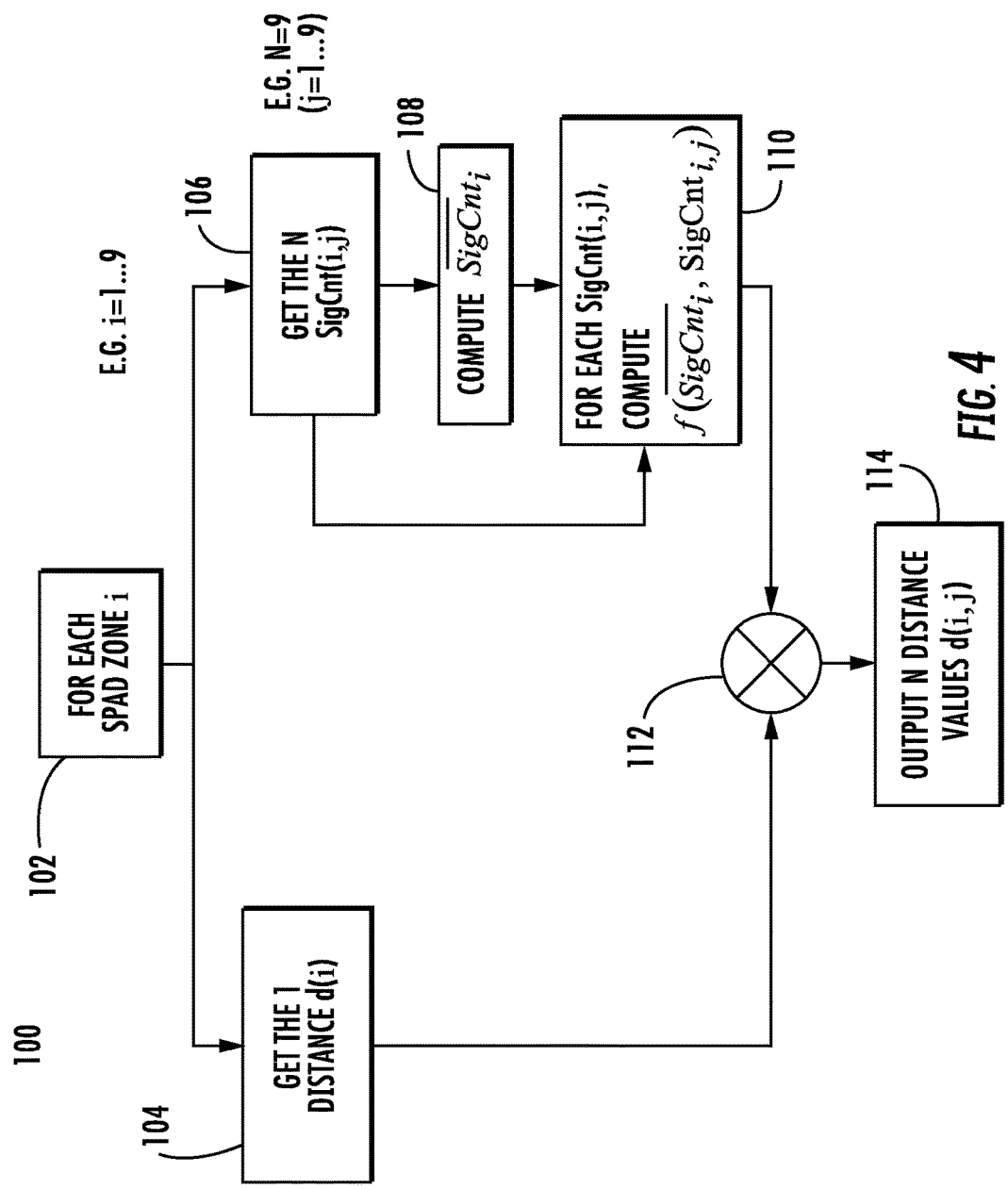
FIG. 4 is a process flow of the upscaling algorithm illustrated in FIG. 3.

A process flow diagram 100 of the upscaling algorithm 32 will now be discussed in reference to FIG. 4. The process flow diagram 100 starts with Block 102, which corresponds to the different distance observations in the depth map 80, as provided by the SPAD zones within the SPAD array 42. In the illustrated example, i varies from 1 to 9 so that there are 9 SPAD zones. Each SPAD zone provides a single distance observation in the depth map 80.

For SPAD zone i=1, Block 104 provides the single distance observation corresponding to this zone. At the same time, Block 106 provides the N intensity observations in the signal count map 70 corresponding to this same SPAD zone. The N intensity observations form an intensity observation set. In the illustrated example, N=9 so that j varies from 1 to 9. The upscaling algorithm 32 computes at Block 108 an average global intensity value from the 9 intensity observation values for SPAD zone i=1. This global intensity observation value is provided to Block 110.

The plurality of upscaling factors for SPAD zone i=1 is now calculated in Block 110. In addition to receiving the global intensity observation value for SPAD zone i=1, Block 110 also receives the 9 intensity observation values corresponding to the same SPAD zone i=1. The plurality of upscaling factors, for each intensity observation set, is based on the average intensity observation value of the intensity observation set and on the individual intensity observation values within the intensity observation set.

More particularly, the plurality of upscaling factors is based on the following equation:

$$f(\overline{SigCnt_i}, SigCnt_{i,j}) = \sqrt{\frac{\overline{SigCnt_i}}{SigCnt_{i,j}}}$$

where $\overline{SigCnt_i}$ is an average intensity observation value derived from the respective intensity observation set;

where $SigCnt_{i,j}$ is the individual intensity observation values within the respective intensity observation set;

where i varies from 1 to M and corresponds to the number of distance observations to the object; and where j varies from 1 to N and corresponds to the number of individual intensity observation values within the intensity observation set encompassing the observed distance i.

The distance observation $d_1$ for SPAD zone 1 from Block 104 is provided to a multiplier 112. The plurality of upscaling factors for SPAD zone 1 from Block 110 is also provided to the multiplier 112. As noted above, the multiplication is based on the following:

$\widehat{d_{i,j}} = d_i \times f(\overline{SigCnt_i}, SigCnt_{i,j})$ where $\widehat{d_{i,j}}$ is an estimate of the upscaled distance observation values. Each of the upscaling factors in the plurality of upscaling factors is multiplied by the single distance observation value $d_1$. This results in the single distance observation value $d_1$ being upscaled to 9 separate values, as provided by Block 114. This process is repeated for each of the remaining SPAD zones 2-9.

The upscaling processor 30 operates in real-time within the electronic device 20. Computation of the upscaling algorithm 32 within the upscaling processor 30 may be simplified with fixed-point approximations or other optimizations (such as look up tables), or taking a straightforward formula (such as linear) if the required precision allows it.

Figure 5:
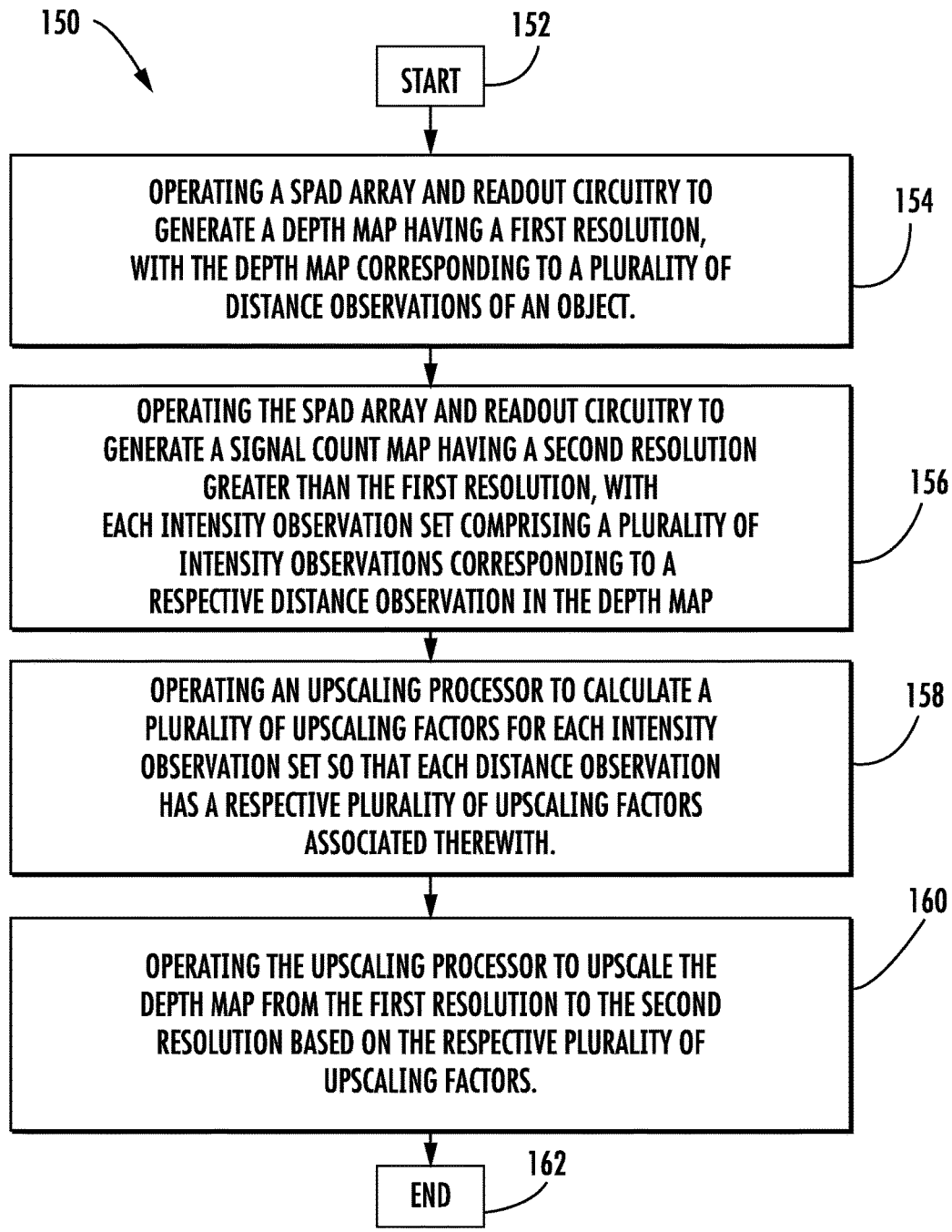
FIG. 5 is a flowchart of a method for operating the electronic device illustrated in FIG. 1 for outputting the upscaled depth map.

Referring now to the flowchart 150 illustrated in FIG. 5, a method for operating the electronic device 20 as described above will be discussed. From the start (Block 152), the method comprises operating the SPAD array 42 and readout circuitry 44 to generate the depth map 80 having a first resolution at Block 154, and a signal count map 70 having a second resolution greater than the first resolution at Block 156.

The depth map 80 may correspond to a plurality of distance observations to an object 60. The signal count map 70 corresponds to a plurality of intensity observation sets of the object 60, with each intensity observation set comprising a plurality of intensity observations corresponding to a respective distance observation in the depth map 80.

The method further comprise operating an upscaling processor 30 to calculate a plurality of upscaling factors for each intensity observation set so that each distance observation has a respective plurality of upscaling factors associated therewith at Block 158. The depth map 80 is then upscaled from the first resolution to a depth map 90 with the second resolution based on the respective plurality of upscaling factors at Block 160. The method ends at Block 162.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
    a single-photon avalanche diode (SPAD) array and a readout circuitry coupled thereto and configured to
        generate, by the readout circuitry, a first depth map having a first resolution, with the first depth map corresponding to a plurality of distance observations to an object, and
        generate, by the readout circuitry, a signal count map having a second resolution greater than the first resolution, with the signal count map corresponding to a plurality of intensity observation sets of the object, with each intensity observation set comprising a plurality of intensity observations corresponding to a respective distance observation in the first depth map; and
    an upscaling processor coupled to said readout circuitry and configured to
        calculate, by the upscaling processor, a plurality of upscaling factors using an upscaling algorithm for each intensity observation set so that each distance observation has a respective plurality of upscaling factors associated therewith, and
        upscale, by the upscaling processor, the first depth map from the first resolution to the second resolution based on the respective plurality of upscaling factors, thereby producing a second depth map having the second resolution.

2. The electronic device according to Claim 1 wherein said readout circuitry is configured to simultaneously generate the first depth map and the signal count map.

3. The electronic device according to Claim 1 further comprising an infrared light source for illuminating the object.

4. The electronic device according to Claim 1 wherein said upscaling processor is configured to perform the upscaling in real-time.

5. The electronic device according to claim 1 wherein said upscaling processor is configured to calculate the plurality of upscaling factors using the upscaling algorithm for each intensity observation set based on an average intensity observation value of the intensity observation set and on individual intensity observation values within the intensity observation set.

6. The electronic device according to Claim 5 wherein the plurality of upscaling factors is calculated, by the upscaling processor, based on the following equation:

$$f(\overline{SigCnt_i}, SigCnt_{i,j}) = \sqrt{\frac{\overline{SigCnt_i}}{SigCnt_{i,j}}}$$

where $\overline{SigCnt_i}$ is the average intensity observation value of a respective intensity observation set;
where $SigCnt_{i,j}$ is the individual intensity observation values within the respective intensity observation set;
where i varies from 1 to M and corresponds to the number of distance observations to the object; and
where j varies from 1 to N and corresponds to the number of individual intensity observation values within the intensity observation set encompassing the observed distance i.

7. An electronic device comprising:
    an infrared light source for illuminating an object;
    a single-photon avalanche diode (SPAD) array and a readout circuitry coupled thereto and configured to
        generate, by the readout circuitry, a first depth map having a first resolution, with the first depth map corresponding to a plurality of distance observations to the object,
        generate, by the readout circuitry, a signal count map having a second resolution greater than the first resolution, with the signal count map corresponding to a plurality of intensity observation sets of the object,
        with each intensity observation set comprising a plurality of intensity observations corresponding to a respective distance observation in the first depth map; and
    an upscaling processor coupled to said infrared light source and to said readout circuitry, and configured to
        calculate, by the upscaling processor, a plurality of upscaling factors for each intensity observation set so that each distance observation has a respective plurality of upscaling factors associated therewith, and
        upscale, by the upscaling processor, the first depth map having the first resolution to produce a second depth map having the second resolution based on the respective plurality of upscaling factors.

8. The electronic device according to Claim 7 wherein said upscaling processor is configured to perform the upscaling in real-time.

9. The electronic device according to Claim 7 wherein said upscaling processor is configured to calculate the plurality of upscaling factors for each intensity observation set based on an average intensity observation value of the intensity observation set and on individual intensity observation values within the intensity observation set.

10. The electronic device according to claim 9 wherein said upscaling processor is configured to calculate the plurality of upscaling factors based on the following equation:

$$f(\overline{SigCnt_i}, SigCnt_{i,j}) = \sqrt{\frac{\overline{SigCnt_i}}{SigCnt_{i,j}}}$$

where $\overline{SigCnt_i}$ is the average intensity observation value of a respective intensity observation set;
where $SigCnt_{i,j}$ is the individual intensity observation values within the respective intensity observation set;
where i varies from 1 to M and corresponds to the number of distance observations to the object; and
where j varies from 1 to N and corresponds to the number of individual intensity observation values within the intensity observation set encompassing the observed distance i.

11. A method for operating an electronic device comprising a single-photon avalanche diode (SPAD) array and a readout circuitry coupled thereto, and an upscaling processor coupled to the readout circuitry, the method comprising:
  generating, by the SPAD array and the readout circuitry, a first depth map having a first resolution, with the first depth map corresponding to a plurality of distance observations of an object;
  generating, by the SPAD array and the readout circuitry, a signal count map having a second resolution greater than the first resolution, with each intensity observation set comprising a plurality of intensity observations corresponding to a respective distance observation in the first depth map; and
  calculating, by the upscaling processor, a plurality of upscaling factors for each intensity observation set so that each distance observation has a respective plurality of upscaling factors associated therewith, and
  upscaling, by the upscaling processor, the first depth map having the first resolution into a second depth map having the second resolution based on the respective plurality of upscaling factors.

12. The method according to Claim 11 wherein the first depth map and the signal count map are generated simultaneously by the SPAD array and the readout circuitry.

13. The method according to Claim 11 further comprising illuminating the object with an infrared light source.

14. The method according to Claim 11 wherein the upscaling is performed in real-time.

15. The method according to Claim 11 wherein calculating the plurality of upscaling factors for each intensity observation set is based on an average intensity observation value of the intensity observation set and on individual intensity observation values within the intensity observation set.

16. The method according to claim 15 wherein calculating the plurality of upscaling factors is based on the following equation:

$$f(\overline{SigCnt_i}, SigCnt_{i,j}) = \sqrt{\frac{\overline{SigCnt_i}}{SigCnt_{i,j}}}$$

where $\overline{SigCnt_i}$ is the average intensity observation value of a respective intensity observation set;
  where $SigCnt_{i,j}$ is the individual intensity observation values within the respective intensity observation set;
  where i varies from 1 to M and corresponds to the number of distance observations to the object; and
  where j varies from 1 to N and corresponds to the number of individual intensity observation values within the intensity observation set encompassing the observed distance i.

* * * * *